United States Patent
Clouet et al.

(10) Patent No.: US 6,467,518 B1
(45) Date of Patent: *Oct. 22, 2002

(54) SUPPORTING MEMBRANE FOR A TREAD

(75) Inventors: Alain Clouet, Sainte-Maurice; Renaud Rivaton, Blanzat, both of (FR)

(73) Assignee: Compagnie General des Establissements Michelin-Michelin & Cie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/595,179

(22) Filed: Jun. 16, 2000

Related U.S. Application Data

(63) Continuation of application No. PCT/EP98/08102, filed on Dec. 11, 1998.

(30) Foreign Application Priority Data

Dec. 19, 1997 (FR) .............................................. 97 16450

(51) Int. Cl.[7] .......................... B60C 9/22; B60C 17/01; B60C 5/22
(52) U.S. Cl. .................... 152/340.1; 152/339.1
(58) Field of Search ........................ 152/339.1, 340.1, 152/331.1, 516, 518

(56) References Cited

U.S. PATENT DOCUMENTS

| | | | | |
|---|---|---|---|---|
| 3,225,811 A | * | 12/1965 | Hawkes | 152/340.1 |
| 3,496,983 A | * | 2/1970 | Bartley | 152/340.1 |
| 3,724,521 A | | 4/1973 | Coddington et al. | |
| 3,885,614 A | * | 5/1975 | Fujikawa | 152/340 |
| 4,164,250 A | | 8/1979 | Shichman | |
| 4,246,948 A | * | 1/1981 | Sarkissian | 152/340 |
| 4,436,132 A | * | 3/1984 | Cesar | 152/362 R |
| 6,283,185 B1 | * | 9/2001 | Rivaton | 152/340.1 |

FOREIGN PATENT DOCUMENTS

FR 2756221 * 5/1998

* cited by examiner

*Primary Examiner*—Michael W. Ball
*Assistant Examiner*—Justin Fischer
(74) *Attorney, Agent, or Firm*—Baker Botts LLP

(57) ABSTRACT

A toric membrane of reinforced rubber, used as a support for the tread of a tubeless tire and forming with the tire P and its mounting rim a rolling assembly, characterized in that, when inflated to a pressure $p_0$ greater than the pressure $p_1$ of the cavity of the tire, it has in the inflated state a crown radius $R_M$ less than the loaded radius $R_E$ of the tire when used at its recommended pressure, the membrane being reinforced in its crown by a crown reinforcement and a hooping reinforcement composed of circumferentially oriented cords or cables, and in its sidewalls by at least one reinforcement ply, wound around an annular reinforcement element having a breaking load slightly greater than that of the hooping reinforcement.

6 Claims, 2 Drawing Sheets

SUPPORTING MEMBRANE FOR A TREAD

This is a continuation of PCT/EP 98/08102, filed Dec. 11, 1998, now WO 99/32308.

BACKGROUND OF INVENTION

The invention relates to a support means for a tread of a tire. The support means constitutes, with said tire and its mounting rim, a rolling assembly for a vehicle, which is intended to be able to travel after a consequent, unexpected loss of pressure from the tire, the tire being more particularly a tubeless tire of the heavy-vehicle type, the form ratio of which is at most 0.8.

French Patent 2,135,333 describes, as a support means which makes it possible to reduce the risks due to deflation or punctures to a minimum, an inflatable toroidal reservoir comprising means for restricting expansion during normal operation of the tire, and means for releasing said restriction means and permitting expansion. The restriction means are formed of a flexible material which is folded and secured so as to form a holding band, whereas the means for releasing the restriction means may comprise either a seam or an adhesive connection, or a fixing element made of fabric.

French Application FR 96/14631, which has not been published to date, describes and claims, as support means for a tread, a toric membrane of reinforced rubber, inflated to a pressure $p_0$ greater than the pressure $p_1$ of the tire cavity, and having, in the inflated state, a crown radius $R_M$ which is less than the loaded radius of the tire used at its recommended pressure, said membrane, being reinforced, at least in its crown, by a crown reinforcement formed of at least one ply of cords or cables, said crown of said membrane furthermore comprising a hooping reinforcement composed of at least one ply of cords or cables oriented circumferentially and having a breaking load per cm of ply at least equal to the product of the crown radius $R_M$ times the pressure, per cm$^2$ of surface area of said ply, resulting in a tension per cm of ply equivalent to the tension due to the maximum centrifugal force to which the tire can be subjected and permitting breaking of the hooping cords or cables for a pressure difference $p_0-p_1'$, existing in the case of the tire undergoing a loss of pressure, greater than the initial pressure difference $p_0-p_1$, that is to say, during normal travel.

The toric membrane may be closed or open. It is said to be closed when its cross-section has a continuous contour, that is to say, one which resembles a section of an inflated inner tube; it is said to be open if the contour of its cross-section is discontinuous, for example when the sidewalls of said membrane have ends located at the level of the beads of the tire in which said membrane is inserted, and being integral therewith or independent therefrom.

The internal pressure $p_0$ of said membrane, when measured cold, that is to say, at 20° C., is greater than the pressure $p_1$ of the inner cavity of the tire by an amount of between $0.5 \times 10^5$ Pa and $5.0 \times 10^5$ Pa, depending on the dimensions of the tire in question. Given that the crown radius $R_M$ of the toric membrane is preferably between 0.80 and 0.97 times the loaded radius of the tire, mainly for reasons of heating of said tire, an excessively large pressure difference risks adversely affecting a certain number of properties of the tire itself, for example the life of the carcass reinforcement of said tire, while demanding an excessively large hooping reinforcement.

The crown reinforcement is preferably formed of two plies of cords or cables which are parallel to each other within each ply and are crossed from one ply to the next, forming an angle of between 50° and 85° with the circumferential direction. The cables or cords are advantageously textile ones for reasons of lightness, flexibility and good corrosion resistance, and preferably are made of aromatic polyamide. The axial ends of the two plies are preferably located on the sidewalls of the membrane, such that, if the maximum axial width of the carcass reinforcement of the tire is referred to as S, the width of the plies is preferably between S and 1.30 S.

The toric membrane, according to the invention described in the above French application, may possibly comprise sidewalls each reinforced by at least one ply of radial cords or cables, said sidewalls possibly being provided advantageously with radial grooves which open onto the metal mounting rim of the tire.

Under normal conditions of travel of the assembly formed by the tire, its mounting rim and the membrane, load, pressure and speed conditions recommended for the tire in question, the membrane retains an equatorial radius which is practically constant and less than the loaded radius of the tire, and the outer walls of its sidewalls are for their very major part in permanent contact with the inner walls of the tire. The friction between said sidewalls causes premature degradation and wear of the impermeable rubber layer which covers the inner sidewall of the tire.

SUMMARY OF THE INVENTION

In order to overcome these disadvantages, the invention proposes an original structure of the toric supporting membrane which makes it possible to control its meridian profile under normal conditions of travel, while permitting complete expansion thereof in the event of a loss of pressure from the cavity of the tire.

The toric membrane of reinforced rubber according to the invention which is used as a support means for the tread of a tire and forms with said tire and its mounting rim, the nominal diameter of which is $D_S$ and the flange of which has an outer diameter $D_R$, a rolling assembly which can roll when the tire is subject to a loss of pressure, inflated to a pressure $p_0$ greater than the pressure $p_1$ of the cavity of the tire, and having in the inflated state a crown radius $R_M$ less than the loaded radius $R_E$ of the tire when used at its recommended pressure, said membrane being reinforced in its crown by at least two plies of cords or cables which are parallel to each other within each ply and are crossed from one ply to the next, said crown of said membrane furthermore comprising a hooping reinforcement composed of at least one layer of cords or cables which are oriented circumferentially and have a breaking load per cm of ply which makes it possible to resist the tension due to the maximum centrifugal force to which the tire is subject, increased by the tension due to the pressure difference $p_0-p_1$ existing during normal travel, but to break for a greater pressure difference $p_0-p_1'$, having each of its sidewalls reinforced by at least one ply, is characterized in that, viewed in meridian section, the sidewall reinforcement ply is wound in each bottom part of the sidewall around an annular reinforcement element, the internal diameter of which lies between a value equal to $D_R$ and a value equal to $D_S$ and the constitution and transverse dimensions of which permit the breaking thereof after that of the hooping reinforcement, and for a pressure difference $p_0-p_1'$, existing in the case of the tire undergoing a loss of pressure, greater than the initial pressure difference $p_0-p_1$, said ply not being integral with said annular element, and having within each of the sidewalls a meridian length such that its meridian profile in the inflated state permits the outer sidewall of the membrane not to be in contact with the inner sidewall of the tire radially outside a position defined by the diameter $D_S+2(D_R-D_S)$.

Advantageously, the breaking load of the reinforcement element around which the sidewall reinforcement ply is wound is between 1.2 and 4 times the breaking load per cm of the hooping reinforcement used in the supporting membrane.

The sidewall reinforcement ply may be radial, or formed of cords or cables which form with the circumferential direction an angle which may for example be between 50° and 90°. Preferably, for manufacturing reasons, the crown reinforcement of the membrane and its sidewall reinforcement plies will be formed by the same plies of oblique cords or cables: a first ply, one of the ends of which is located in the region of one of the shoulders of the membrane, and the other end of which is the end of its upturn around the reinforcement element located on the side opposite said shoulder; a second ply, one of the ends of which is located in the region of the other shoulder of the membrane, and the other end of which is the other end of the upturn. Each individual ply may also be formed of cords or cables which are radial in the sidewall parts and oblique in the crown part of the membrane.

The annular reinforcement element may advantageously be a single cable of aromatic polyamide formed of several strands. It may also be formed by the winding of a filament of aromatic polyamide on itself so as to form a section of ply which is virtually perpendicular to the axis of rotation of the assembly.

The support strip may have elements in relief which are substantially frustoconical and which form circumferential rows of blocks or pads, the hooping reinforcement of the membrane preferably being located on the radially outer face of the support strip and being in the form of a plurality of narrow strips of several circumferential textile cables of widths substantially equal to the widths of the cutouts or grooves between rows of elements in relief of the support strip and arranged in said grooves independently of the support strip. This hooping structure, when the inner cavity of the tire is devoid of inflation gas and by breaking of the circumferential cables of the strips due to the significantly increased pressure difference, permits faster, more complete expansion of the toric membrane.

The characteristics and advantages of the invention will be better understood with reference to the following description, which refers to the drawing illustrating an example of embodiment in non-limitative manner.

DESCRIPTION OF PREFERRED EMBODIMENTS

Figure 2:
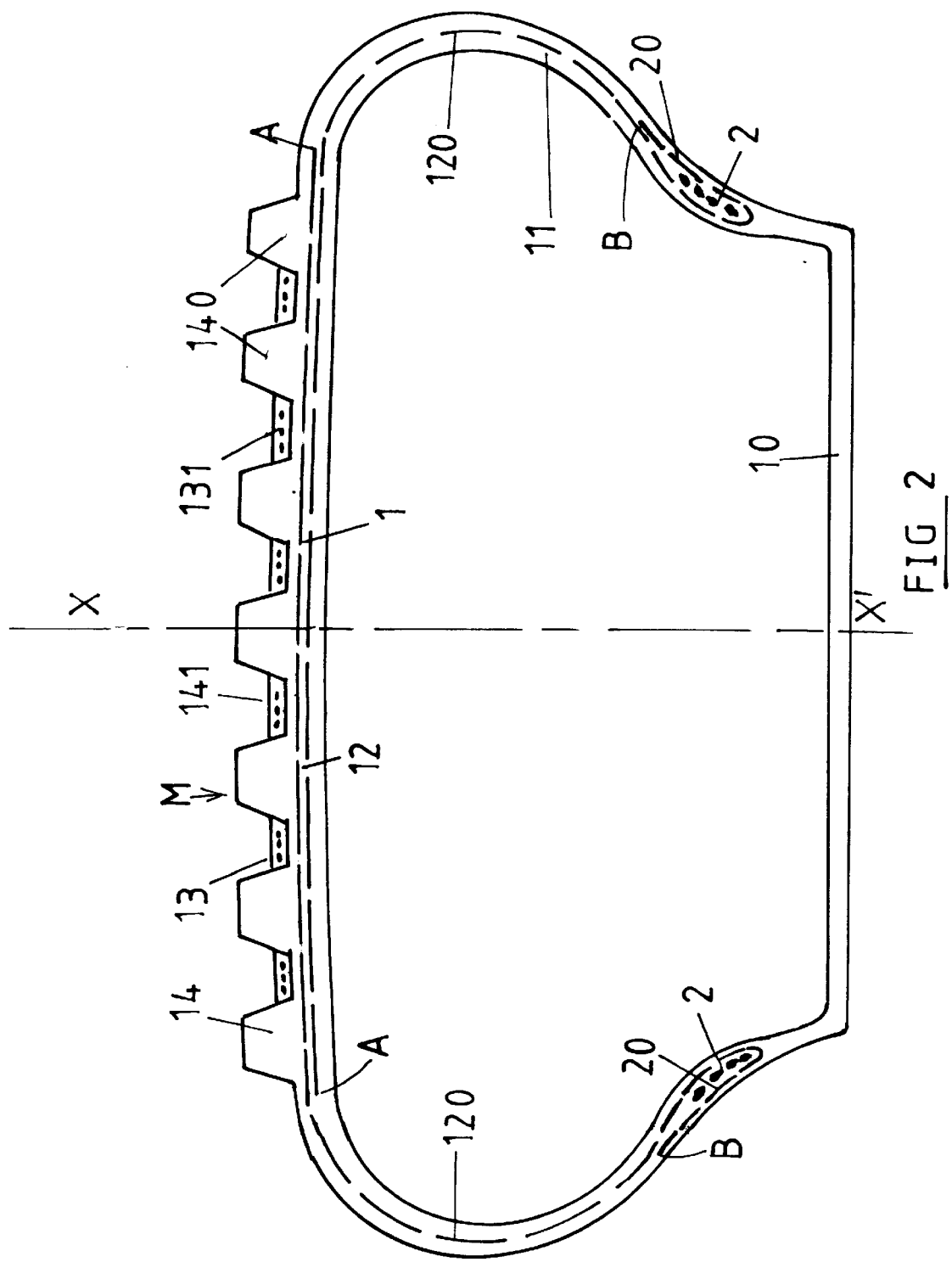
FIG. 2 is an enlarged diagram of the membrane of FIG. 1.

The toric membrane M according to the invention, in the example described (FIG. 2), is closed and reinforced at its crown 1. Being of constant, low thickness on its radially inner part 10, it is thicker on its sidewalls 11 and at its crown 1. It is reinforced by two plies 120, each ply being formed of polyester cables which are parallel to each other in the ply with a pitch corresponding to 102 cables per dm, and forming an angle of 60° with the equatorial plane XX' of the assembly, which angle will be in one direction for one of the plies and in the opposite direction for the other ply. The width of each of the two plies 120 is such that one of its ends A is located in the region of one of the shoulders of the membrane M, whereas the other end B of said ply 120 is the end of the upturn 20 which it forms after winding around the annular reinforcement element 2 in the lower part of the tire located on the opposite side to said shoulder. The two plies 120 thus form, in the region of the crown of the membrane M, a crown reinforcement 12 composed of two layers of cables which are parallel to each other in each portion of ply and are crossed from one layer to the next, forming an angle of 60° with the equatorial direction.

The crown reinforcement 12 thus formed, which is readily expansible, is surmounted by a rubber support strip 14 provided with frustoconical elements in relief 140 separated from each other by recesses 141. These frustoconical "blocks" form circumferential rows on the surface of the strip 14 such that, between two axially adjacent rows of blocks 140 there is located a hooping strip 131 of circumferential cables, said cables being of aromatic polyamide, formed of three cords of 330 tex. Said strip of cables has a curve of tensile force per cm of ply (perpendicular to the direction of the cables) as a function of the relative elongation $F\ cm = f(\epsilon)$ having a relatively steep slope for a force of between 0 and the breaking load of 145 daN per cable. All the strips 131 of 3 circumferential cables thus defined which form the hooping reinforcement 13, their number being equal to the number of axial intervals between rows of blocks 140, ensure the hooping function of the membrane M, which hooping is firstly against the forces due to centrifugal force and secondly against the forces due to the pressure difference $p_0-p_1$, $p_0$ being the inflation pressure of the toric membrane M, equal to $9.5\times10^5$ Pa, and $p_1$ being the pressure of the tire P, equal to $9.0\times10^5$ Pa. Said hooping function enables the membrane M, under normal conditions of travel of the assembly, that is to say, under the loading, pressure and speed conditions recommended for the tire in question, to maintain a radius $R_M$ which is practically constant and less than the loaded radius $R_E$ of the tire P under normal conditions of travel. Said strips 131 allow greater mileage in degraded mode.

Each annular reinforcement element 2 is formed by winding on itself a cable of aromatic polyamide which is composed of 3 cords of 330 tex until four turns of winding in the example described are formed. The annular element 2 breaks slightly after the breaking of the strips 131 of circumferential hooping cables, and the separation of the annular element from the ply 120 (the annular element being coated with an anti-adhesion product) permits an increase in its circumference and thus complete expansion of the membrane in the event of a loss of pressure by the tire and for a pressure difference $p_0-p'_1$ greater than the initial pressure difference of $0.5\times10^5$ Pa.

Figure 1:
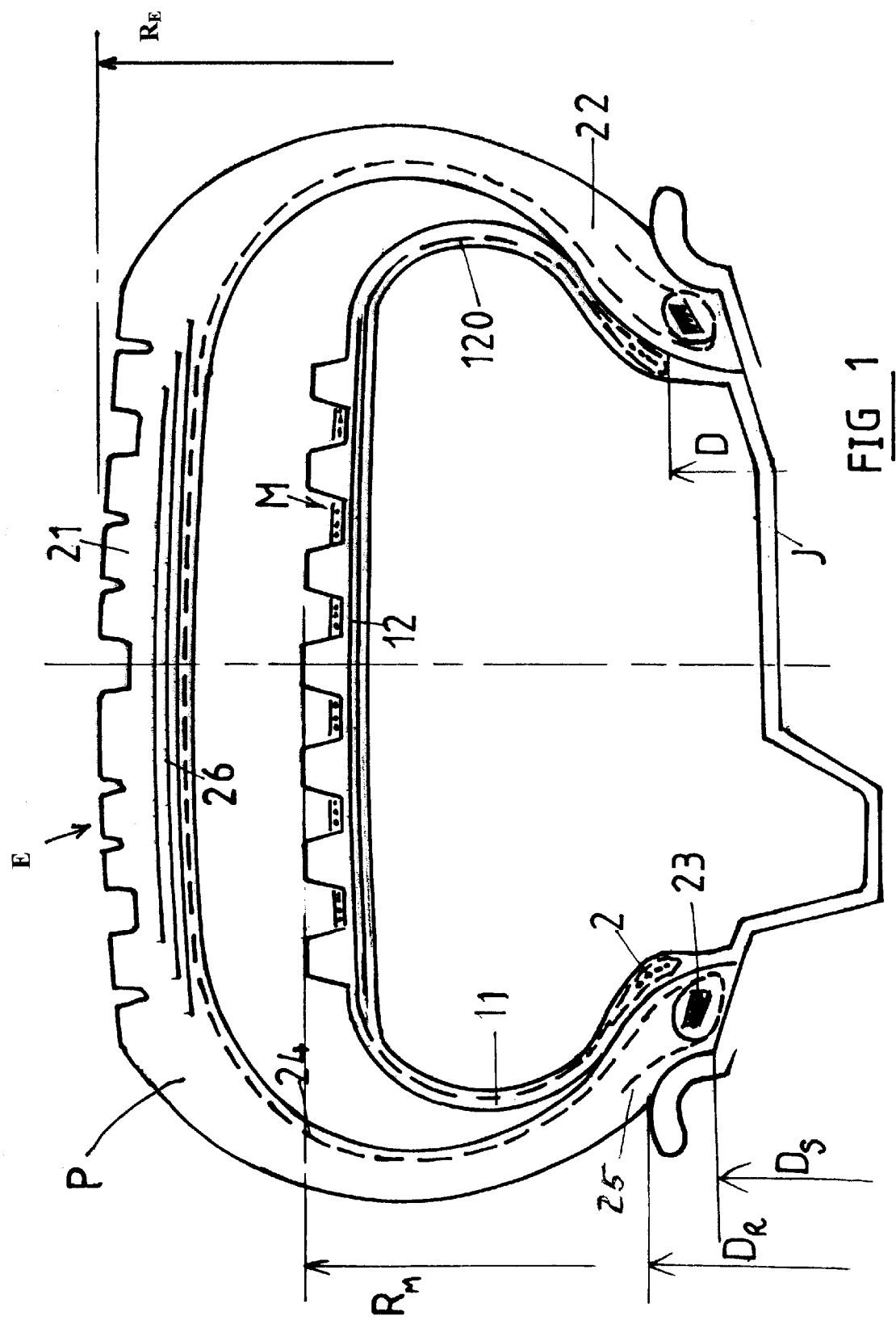
FIG. 1 is a diagram of a toric support membrane according to the invention, in position in the tire mounted on its operating rim.

In FIG. 1, the assembly E is formed of the tire P, of dimension 495/45-R-22.5 in the example described, of the mounting rim J and of the toric membrane M according to the invention. The tire P is a universally known tire, with sidewalls which are joined radially to the outside to a tread 21 and are extended radially to the inside to two beads 22, each bead 22 being reinforced by at least one bead wire 23 around which a radial carcass reinforcement 24 is anchored to form upturns 25. Said carcass reinforcement 24 is surmounted radially within the crown by a crown reinforcement 26, composed of at least two plies of metal cords or cables which are parallel to each other within each ply and are crossed from one ply to the next, forming an angle which may be between 5° and 45° with the circumferential direction. The tire P is a tubeless tire, and comprises internally a layer of rubber mix which is impermeable to the inflation gases.

The annular reinforcement element 2 for the supporting membrane M has an internal diameter D between a value $D_R$ which is equal to the diameter of the flange of the rim J, referred to as 17.00×22.5, on which the tire P is mounted and a value $D_S$ which is the nominal diameter of said rim J, as defined by the standardization norms which are in force. The meridian length of the reinforcement ply 120 for a sidewall of the membrane M is such that the meridian profile in the inflated state of said ply is not in contact with the inner sidewall of the tire outside a zone of radial height between the diameter $D_S$ and a diameter $D_S+2(D_R-D_S)$.

We claim:

1. A toric membrane of reinforced rubber, used as a support means for the tread of a tire and forming with said tire and its mounting rim a rolling assembly which can roll when the tire is subject to a loss of pressure, the rim having a nominal diameter $D_S$ and a flange having an outer diameter $D_R$, the tire having a loaded radius $R_E$ when used at the recommended pressure and defining with the rim an internal pressurized cavity, the toric membrane being located within the tire cavity and inflated to a pressure $p_0$ greater than the pressure $p_1$ of the cavity of the tire, and, so inflated, having a crown radius $R_M$ less than the loaded radius $R_E$ of the tire, said membrane having a crown reinforced by at least two plies of cords or cables which are parallel to each other within each ply and are crossed from one ply to the next, said crown of said membrane furthermore comprising a hooping reinforcement composed of at least one ply of cords or cables oriented circumferentially and having a breaking load under tension per widthwise cm of ply at least equal to the sum of (1) the tension due to the product of the crown radius $R_M$ times the pressure per cm² of surface area of the ply equivalent to a tension per widthwise cm of ply due to the maximum centrifugal force to which the tire is subject, and (2) the tension due to the pressure difference $p_0-p_1$ existing during normal travel, but less than the sum of (1) as aforesaid and (3) a greater pressure difference $p_0-p'_1$ resulting from a loss of inflation pressure in the tire cavity, said membrane having sidewalls reinforced by at least one ply, wherein, viewed in meridian section, each sidewall ply is wound in a bottom part of the sidewall around an annular reinforcement element, the internal diameter of each annular reinforcement element being between a value equal to $D_R$ and a value equal to $D_S$ and the constitution and transverse dimensions of each annular reinforcement element being such that breaking load thereof under tension is greater than that of the hooping reinforcement at a pressure difference $p_0-p'_1$, existing in the case of the tire cavity undergoing a loss of inflation pressure, greater than the initial pressure difference $p_0-p_1$, said each sidewall ply not being integral with said each annular reinforcement element, and said each sidewall ply having within each of the sidewalls a meridian length such that the meridian profile thereof in the inflated state of the toric membrane restrains the outer sidewall of the toric membrane against contact with the inner sidewall of the tire radially outside a position defined by the diameter $D_S+2(D_R-D_S)$.

2. A membrane according to claim 1, wherein the breaking load of each annular reinforcement element around which the respective sidewall reinforcement ply is wound is between 1.2 and 4 times the breaking load, per widthwise cm of the hooping reinforcement used in the membrane.

3. A membrane according to claim 1, wherein each sidewall reinforcement ply is formed of radial cords or cables.

4. A membrane according to claim 1, wherein each sidewall reinforcement ply is formed of cords or cables which form with the circumferential direction an angle between 50° and 90°.

5. A membrane according to claim 1, wherein the crown reinforcement and the reinforcement plies of the sidewalls are formed by the same plies of oblique cords or cables which form with the circumferential direction an angle between 50° and 90°, said same plies comprising a first ply, one of the ends A of which is located in the region of one of the shoulders of the membrane, and the other end B of which is the end of an upturn around the annular reinforcement element located on the side opposite said one shoulder, and a second ply, one of the ends A of which is located in the region of the other shoulder of the membrane, and the other end B of which is the other end of the other upturn.

6. A membrane according to claim 1, wherein each annular reinforcement element is formed by the winding of a filament of aromatic polyamide on itself so as to form a section of ply which is virtually perpendicular to the axis of rotation of the assembly.

* * * * *

UNITED STATES PATENT AND TRADEMARK OFFICE
CERTIFICATE OF CORRECTION

PATENT NO. : 6,467,518 B1 Page 1 of 1
DATED : October 22, 2002
INVENTOR(S) : Clouet et al.

It is certified that error appears in the above-identified patent and that said Letters Patent is hereby corrected as shown below:

<u>Title page,</u>
Item [56], References Cited, U.S. PATENT DOCUMENTS, "3,496,983" should read -- 3,469,983 --

Item [73], Assignee, "General" should read -- Générale --; and "Establissements" should read -- Etablissements --

<u>Column 1,</u>
Line 41, "$p_0$-$p_1'$" should read -- $p_0$-$p'_1$ --

<u>Column 3,</u>
Line 54, "rim;" should read -- rim; and --

<u>Column 4,</u>
Line 53, "$p_0$-$p_1$" should read -- $p_0$-$p'_1$ --

<u>Column 5,</u>
Line 14, "tire outside a zone of radial height between" should read -- tire radially outside a position defined by --
Line 15, "the diameter $D_s$ and a" should be deleted <u>Column 6,</u>
Line 19, "load, per" should read -- load per --

Signed and Sealed this

Thirteenth Day of May, 2003

JAMES E. ROGAN
*Director of the United States Patent and Trademark Office*